US008468597B1

(12) United States Patent
Warner et al.

(10) Patent No.: US 8,468,597 B1
(45) Date of Patent: *Jun. 18, 2013

(54) SYSTEM AND METHOD FOR IDENTIFYING A PHISHING WEBSITE

(75) Inventors: Gary Warner, Birmingham, AL (US); Bradley Wardman, Birmingham, AL (US)

(73) Assignee: UAB Research Foundation, Birmingham, AL (US)

( * ) Notice: Subject to any disclaimer, the term of this patent is extended or adjusted under 35 U.S.C. 154(b) by 502 days.

This patent is subject to a terminal disclaimer.

(21) Appl. No.: 12/647,955

(22) Filed: Dec. 28, 2009

Related U.S. Application Data

(60) Provisional application No. 61/141,434, filed on Dec. 30, 2008, provisional application No. 61/171,293, filed on Apr. 21, 2009.

(51) Int. Cl.
| G06F 11/00 | (2006.01) |
| G06F 12/14 | (2006.01) |
| G06F 12/16 | (2006.01) |
| G06F 7/04 | (2006.01) |
| G06F 17/30 | (2006.01) |

(52) U.S. Cl.
USPC ............ 726/22; 726/23; 726/24; 726/25; 726/26; 726/34; 713/175; 713/176; 713/187; 713/188; 709/205; 709/223; 709/225; 705/50

(58) Field of Classification Search
USPC ............... 726/22–26, 34; 713/175, 176, 187, 713/188; 709/205, 223, 225; 705/50
See application file for complete search history.

(56) References Cited

U.S. PATENT DOCUMENTS

| 7,698,442 | B1 * | 4/2010 | Krishnamurthy et al. ..... 709/229 |
| 7,958,555 | B1 * | 6/2011 | Chen et al. ..................... 726/22 |
| 2004/0243829 | A1 * | 12/2004 | Jordan ........................ 713/200 |
| 2008/0046738 | A1 * | 2/2008 | Galloway et al. ............ 713/176 |
| 2008/0140611 | A1 * | 6/2008 | Takehara et al. ................. 707/2 |
| 2008/0172738 | A1 * | 7/2008 | Bates et al. ..................... 726/22 |
| 2009/0077383 | A1 * | 3/2009 | de Monseignat et al. ..... 713/175 |
| 2010/0251380 | A1 * | 9/2010 | Zhang et al. ................... 726/26 |
| 2010/0313266 | A1 * | 12/2010 | Feng et al. ..................... 726/23 |

* cited by examiner

*Primary Examiner* — Edan Orgad
*Assistant Examiner* — Kari Schmidt
(74) *Attorney, Agent, or Firm* — C. Brandon Browning; Maynard, Cooper & Gale, PC

(57) ABSTRACT

A system and method for enhancing spam avoidance efficiency by automatically identifying a phishing website without human intervention. The system receives a stream of suspect Internet urls for potential phishing websites and uses a comparison strategy to determine whether the potential phishing website has already be labeled as a bonefid phishing website. A comparison system is utilized in which similarity data is calculated on various elements of the potential phishing website and then compared to similarity data of known phishing websites. Various types of categorization structures and notification strategies are utilized in the system.

19 Claims, 5 Drawing Sheets

SYSTEM AND METHOD FOR IDENTIFYING A PHISHING WEBSITE

This application claims the benefit of filing priority under 35 U.S.C. §119 from provisional patent application Ser. Nos. 61/141,434 filed Dec. 30, 2008 and 61/171,293 filed Apr. 21, 2009, both entitled: SYSTEM AND METHOD FOR IDENTIFYING A PHISHING WEBSITE. All information disclosed in those prior applications is incorporated herein by reference.

FIELD OF INVENTION

The present invention relates generally to spam prevention methods and systems. In greater particularity, the invention relates to methods for preventing spam by assigning identification indicia to phishing websites. In even greater particularity, the invention relates to methods of spam and elicit e-mail prevention through pre-categorized content correlation.

BACKGROUND OF THE INVENTION

Similar to paper mail fraud, email fraud involves a deliberate attempt by a perpetrator to defraud using email as the contact mechanism. Fraudulent emails have become a pernicious force, capturing the attention of the media, corporate executives, legislators, and consumers, and costing corporate institutions millions in information technology ("IT") resources. Email fraud ranges from rudimentary attraction scams to more complex attempts to perpetrate online identity theft or misrepresent the brand of an established corporate entity, such as a financial institution. Financial institutions are a favorite target among perpetrators of fraud because of the potential for immediate access to monetary assets.

The most insidious and damaging varieties of email fraud incorporate two related techniques: (1) brand spoofing, and (2) phishing. Brand spoofing occurs when the perpetrator (i.e. a scammer) sends out legitimate-looking email that appears to originate from large or recognizable companies. Spoofing emails include deceptive content in the body of the message, fraudulently using the spoofed company's logo and/or using convincing text that seems to be legitimate. By hijacking brands, scammers can attract the attention of existing and potential customers of a company with the hope of manipulating them in some fashion. However, spoofing is usually not the end-goal of perpetrators of fraud. The payoff occurs when recipients are fooled into providing personal financial information which may then be peddled to other third parties who are in a position to capitalize on the information to obtain revenue. The term for such malicious attempts to collect customer information for the purpose of committing fraud is called "phishing" (pronounced "fishing") in which criminals "fish" for financial information from an imagined sea of online consumers using fraudulent emails as the bait.

For example, an email might direct a consumer to a fraudulent website that appears to be a legitimate site. This fraudulent site might include instructions or forms that entice a consumer to provide bank accounts, addresses, social security numbers, or other private information. Such information can then be utilized by criminals to commit identity theft or steal assets from the unsuspecting consumer.

Security professionals attempt to diminish the impact of phishing through user education, filtering of phishing emails, and the use of anti-phishing toolbars, all designed to prevent users from accessing the phishing website where a consumer might divulge private information. Despite those efforts, a large number of phishing sites are created each year. The Anti-Phishing Working Group ("APWG") reports that during the first half of 2008, 47,324 unique phishing sites (i.e. each site had a unique Universal Resource Locator or "URL") were created to host an "attack" against a company, such as a financial institution. Of these sites 26,678 unique domain names and 3,389 unique numerical IP addresses were used. While some of these sites may exist for weeks, most are identified and shut down by adversely affected parties very quickly. In fact, according to APWG, the phishing websites reported in the first half of 2008 averaged a website lifespan of 49.5 hours with a median life existence time of 19.5 hours. Hence, phishing websites are transitory objects and must be newly created continuously to be effective for a phishing perpetrator.

Unfortunately, the process of shutting down a phishing website is difficult. A typical phishing incident response and investigation team receives in excess of 1 million potential phishing URLs each month which must be sorted, de-duplicated, confirmed, labeled, and referred for appropriate action. Typically, potential fraud URLs are reported from customers and vendors. These sets are reduced to unique URLs, sometimes using regular expressions or pattern matching to identify URLs which resolve to the same content. That list is then prepared in a "work queue," where an incident response group manually reviews each site to determine whether it is committing fraud against a brand for which they are responsible. If the site is fraudulent and attacking a brand of interest, additional attributes of the site, such as whois information, the ASN or netblock of the hosting IP address, or the registrar used to register the site are determined. This information is then used to generate a communication to parties who are in a position to stop the fraudulent website from resolving within the DNS service. Some portions of this process may be automated, but any automated portions cannot begin until the reported URL is retrieved from a work queue and verified.

Once a phishing site has been identified and a communication transmitted to a party in a position to do something about its operation, such as for example a webmaster or webhosting company, their staff may "lock" or disable the hosting account, or change permissions to the offending content so that visitors cannot retrieve the content. An ISP may temporarily block internet access for the computer containing the offending content. Or, a registrar may remove name resolution services for the domain name, or may otherwise delete or disable the domain name.

As indicated above, the timeliness of the appropriate response is currently hindered mostly by the delay introduced by the need for human verification of the potentially offending website, which is often repeated multiple times by various parties all working toward a common identification process. Hence, the anti-spam, anti-phishing industry would benefit from having a trustworthy method for confirming phishing sites without the need for human intervention.

SUMMARY OF THE INVENTION

The disclosed invention is a system and method for automatically identifying a phishing website by receiving a spam report (e.g. a suspect url) on a potential phishing website, downloading files associated with the potential phishing website, generating similarity data on the retrieved files of the suspected phishing website, storing the similarity data in a database pertaining to those files, comparing the calculated similarity data to similarity data of other known phishing websites, classifying the phishing site as either a potentially new phishing website or a previously known phishing website, and notifying the proper action authority in response to such conclusions. Multiple comparison categorization classes are disclosed and identification strategies presented. The system includes processing methods for assigning unique similarity data values.

BRIEF DESCRIPTION OF THE DRAWINGS

An apparatus for efficiently identifying phishing websites incorporating the features of the invention is depicted in the attached drawings which form a portion of the disclosure and wherein.

DESCRIPTION OF THE PREFERRED EMBODIMENTS

Figure 1:
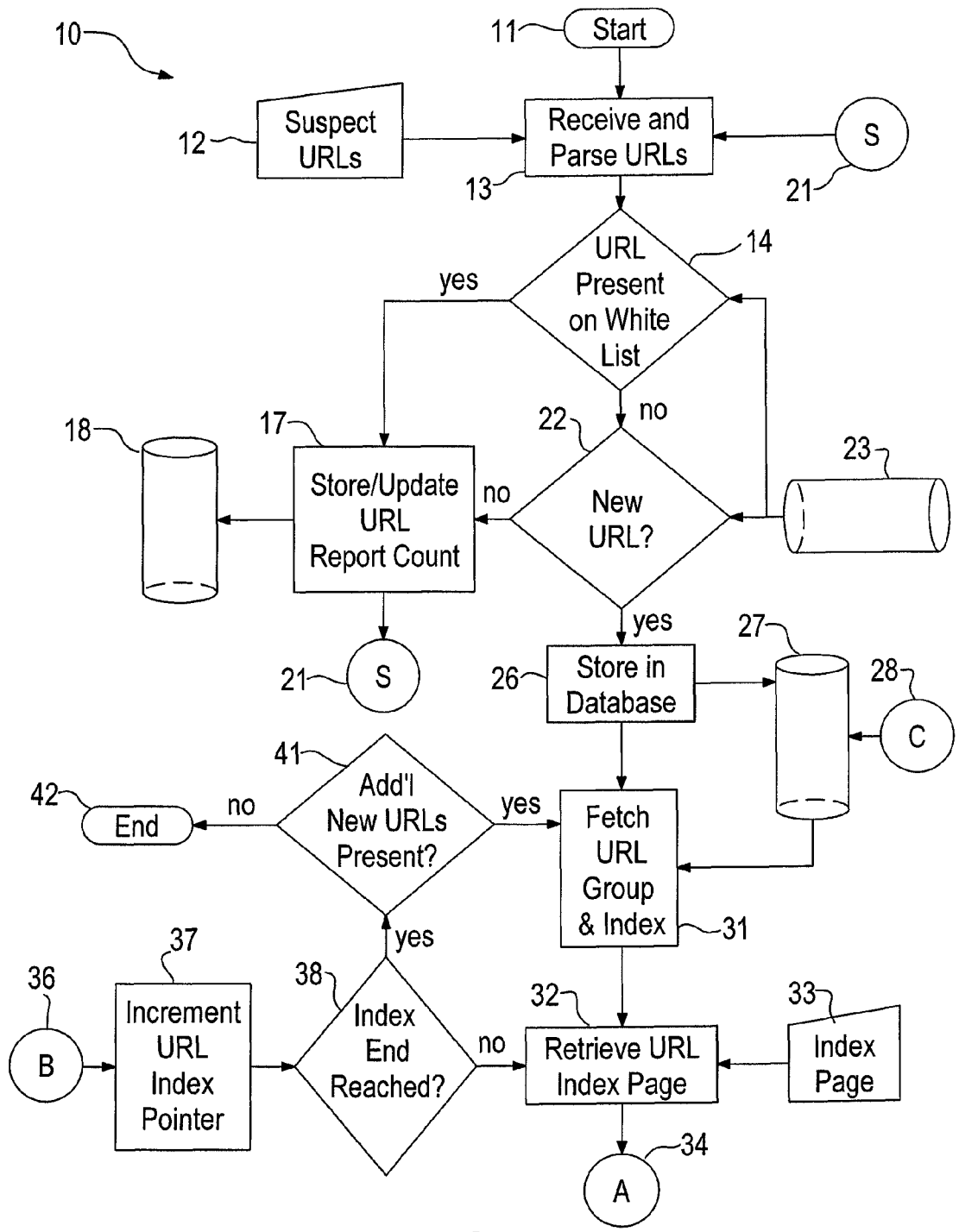
FIG. 1 is a process flow diagram of part of the preferred embodiment of the invention.

Referring to FIG. 1, the system 10 is constructed to run on a computer system, such as a computer server, having a modern operating system like Microsoft Windows or a variant of UNIX such as Linux. The present system is currently compiled to run on a Linux OS derivative, Cent OS, offered by Red Hat. Database functionality is provided by PostgreSQL, which is a powerful, open source object-relational database system. PERL is currently used in the system to control communications through the Internet and to parse received e-mails. While the interpretive language PERL is currently used by the inventors, it is anticipated that a compiled language such as C would ultimately implement the features of the system.

Upon initiation 11 the system 10 receives 13 a string of supplied urls 12 and parses them 13 into a text file having a separate url on each line. The urls 12 are provided by a variety of sources such as an anti-spam company, an anti-phishing company, a "shut-down" company, a beneficiary (e.g. a customer), forwarded e-mails from consumers, notifications from other entities that are active in preventing phishing website proliferation, or communications from an automated databases holding a collection of urls maintained by anti-spam associations. Further, consumers might have an autonomous program running on their PCs that automatically capture communications from suspected phishing sites and send those communications to the system 10 for automatic processing, or a consumer might manually invoke an installed plug-in that is designed to work with the consumer's e-mail program to forward a forensically clean copy of the suspected phishing communication. In addition, a pre-parsing program (not shown) can receive forwarded e-mails to the system and extract urls present in an e-mail and feed those urls to the system. The programming language PERL typically includes a parsing function in its function library that can be used to successfully parse e-mails to yield urls present in the e-mail body.

Decision step 14 provides the exclusion of urls that might have been reported by consumers as a potential phishing website, but which are legitimate sites identified beforehand by a beneficiary of the system 10. For example, if a particular domain is predefined as holding beneficiary sites, all urls reported utilizing that domain name would be excluded from the system's analysis. Decision step 14 can also be incorporated into a pre-processing step (not shown) that conditions the string of suspect urls to omit any urls which are present or associated with a legitimate site. Irrespective of the order of this step, beneficiary sites can be saved in a database 23 to effectively create a "white list" of beneficiary related non-phishing sites that do not need to undergo processing in accordance with the present system. While the present system uses a separate white list recordation strategy, white listed urls could easily be entered into a main database 18 and simply categorized as a beneficiary url to avoid further processing on the beneficiary sites. However, by designating a url as a white listed entry prior to or at the time of urls parsing, some processing savings in the steps of fetching a url group and indexing that group may be realized, as will be discussed further.

Upon the receipt of a white listed url, a report counter logs the receipt number associated with the url 17 and stores that information 18. The system then loops back S 21 to process the next url at 13. If a received url is not present on a white list, step 22 determines whether the url has been encountered by the system 10 before. If it has, the system then logs the encounter for that particular url and moves on to the next present url at 13. Upon the receipt of a url which has not been encountered by the system 10 before and is not present on a white list, the new potential phishing url is stored 26 in a database 27 for further processing. Database 27 has a structure for storing multiple urls with categories for each and assigns certain status flags that facilitate processing of each url and the matching of a currently processed url with prior processed urls. For example, some status flags that facilitate processing are: Retrieved page/content files; Not Retrieved; Confirmed Phish; Unconfirmed Phish; Not a Phish; Unknown (not know whether the url was or was not a phish); or Escalate (have a more advanced person look at page).

A suitable database structure for implementing database 27 is shown in Table 1.0, and an explanation of values for the variables listed in table 1.0 is shown in table 2.0. It is noted that each url may have a table of values associated with each variable as is known in database topologies.

TABLE 1.0

```
CREATE TABLE urlTable(
    URLid          SERIAL UNIQUE NOT NULL,
    URL            varchar(2000),
    domain         varchar(1000),
    machine        varchar(1000),
    path           varchar(2000),
    args           varchar(1000),
    firstdate      date,
    lastdate       date,
    count          integer,
    brand          varchar(100),
    confirmed      varchar(2),
    doesMatch      boolean,
    timestamp      timestamp,
    numberOfFiles  int,
    mainHTML       varchar(1500),
    haveRetrieved  boolean,
    PRIMARY KEY(URLid)
);
CREATE TABLE domainXReference(
    domain         varchar(100) UNIQUE NOT NULL,
    numberParts    smallint,
    PRIMARY KEY(domain)
);
CREATE TABLE fileTable(
    URLid          integer NOT NULL    REFERENCES urlTable (URLid),
```

TABLE 1.0-continued

```
fileNumber      integer NOT NULL,
path            varchar(1750),
MD5             varchar(40),
hasBrand        boolean,
filename        varchar(500),
    PRIMARY KEY (URLid, fileNumber)
);
CREATE TABLE siteComparison(
URLid              integer NOT NULL   REFERENCES urlTable (URLid),
relatedURL         int,
numberOfsimilarFiles   int,
files              text[ ],
similarityScore    int,
    PRIMARY KEY(URLid, relatedURL)
);
```

TABLE 2.0

| Var. No. | Var. Name | Description |
|---|---|---|
| 1 | URLid | Unique id Assignment to received URL. |
| 2 | URL | Parsed Received URL. |
| 3 | domain | domain for the Parsed URL |
| 4 | machine | the machine name of the Parsed URL on the domain. |
| 5 | path | path to the file on the machine of Parsed URL. |
| 6 | args | Reserved. |
| 7 | firstdate | First receipt date the received URL. |
| 8 | lastdate | Last receipt date the received URL. |
| 9 | count | Number of times the URL has been received. |
| 10 | brand | Associated brand of the received URL. |
| 11 | confirmed | Whether the received URL is a confirmed phishing site. |
| 12 | doesMatch | Whether the received URL matches another URL in the database. |
| 13 | timestamp | Receipt time of received URL. |
| 14 | numberOfFiles | File count associated with the received URL. |
| 15 | mainHTML | Calculation of md5 hash value of main html page (e.g. index page) for received URL. |
| 16 | haveRetrieved | Whether the main html (e.g. index page) has been retrieved. |
| 17 | URLid | Unique id Assignment to received URL. |
| 18 | fileNumber | Assignment of unique file number to a retrieved file on a received URL site. |
| 19 | path | Path to the file retrieved the received URL site. |
| 20 | MD5 | md5 value of file retrieved file. |
| 21 | hasBrand | Whether a Brand has been associated with a retrieved URL. |
| 22 | filename | Name of the saved file. |
| 23 | URLid | Unique id Assignment to received URL. |
| 24 | relatedURL | URL compared with retrieved URL. |
| 25 | numberOfsimilarFiles | Recorded number of exact matches between URLs. |
| 26 | files | List of files. |
| 27 | similarityScore | Calculated Similarity Value. |

Figure 2:
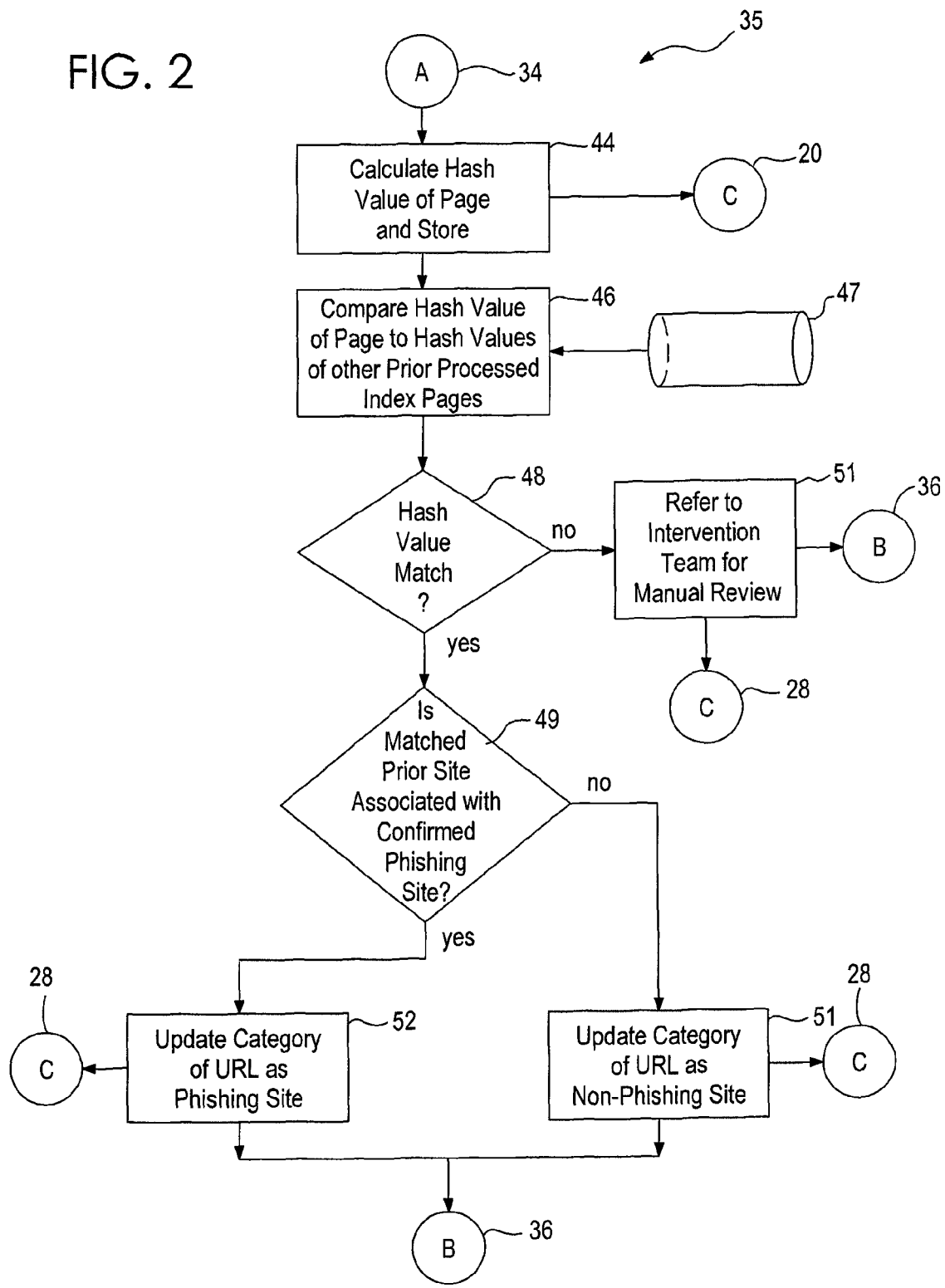
FIG. 2 is a process flow diagram of another part of the preferred embodiment of the invention.

After a sufficient number of new urls have been stored in database 27, as may be predefined by an administrator of the system, a group of url values is retrieved 31 from the database 27 and each url serially indexed into a temporary holding file. The system preferably accesses the database and retrieves the group of url values based upon a predefined time sequence, but the system can also be configured to retrieve groups of urls depending upon a set number of received urls yet to be processed by the system. The index page 33 for the first url in the holding file is then accessed, retrieved 32, and stored temporarily for analysis by comparison process 35 (FIG. 2). The action 32 utilizes a wget command to retrieve the index file. Wget is a free utility for the non-interactive downloading of files from the Web, and supports various protocols such as, http, https, and ftp.

Referring to FIG. 2, comparison process 35 provides a method for calculating and assigning a hash value to the retrieved index page for the subject url, storing that value in the database 27, and comparing the value to other previously calculated hash values for other url pages. Process 35 is written in Java™ to allow for cross platform uniformity, but any optimized processing language may implement the process.

It will be understood by those skilled in the art that process 35 may be scaled to accommodate multiple processing threads of process 35 such that speed advantages can be gained by incorporating multiple processor based hardware. Hence, even though a large collection of urls may be stored for processing in database 27, the system hardware topology can be easily expanded to accommodate ever increasing quantities of urls. Such a processing structure allows for sustained rapid processing of individual urls in response to increased url volume demands.

After obtaining the index page 33 a hash value is calculated 44 on the page and stored C 20 in database 27. A hash value on the index page 33 is obtained by calculating an MD5 checksum utilizing a known library function called "md5deep." Md5deep is a hashing function using MD5 (Message-Digest algorithm 5) that yields a single integer value uniquely representative of the downloaded index page. As is known, a hash function is any well-defined procedure or mathematical function which converts a large, possibly variable-sized amount of data into a small datum, usually a single integer, that may serve as an index into an array. In this case, the MD5 hash function is utilized to calculate a hash value for comparison with other stored hash values in database 27. Other hash calculation methodologies may be utilized, namely, WHIRLPOOL, SHA-1, SHA-256, or RIPEMD-160, but the inventors preference is MD5 because the processing algorithms are well understood and readily available as downloadable library functions for most programming languages.

Once stored, the hash value is compared 46 to other known hash values 47 and a match determined 48. If no match is found the database 27 is updated C 28 to reflect that the processed url has no match and the url is escalated for manual review by an intervention team 51. If a match is found in database 27, the category of the url is updated to reflect the url as either a phishing site or a non-phishing site pursuant to steps 49, 51, and 52. In either case, process control is subsequently returned B 36 to increment index pointer 37 of the URL group fetched in step 31 and the next url is processed. Currently, the process 35 is designed to stop looking for additional matches once step 48 encounters a first match. This is because presumably once a unique hash value has been categorized, that url associated with that unique hash value will not change. However, the inventors anticipate that in the unlikely event that identical hash values exist for multiple urls, the, database 27 and process 35 could be configured to search for all recorded hash values and record all matches. If multiple identical hash values exist, most likely the url would be escalated for manual review to understand the reason for the existence of multiple identical hashes.

As long as an unprocessed url is present in the URL group per step 41, comparison process 35 continues. Since fetch process 31 and store process 26 are continuous, the absence of an additional unprocessed url triggers the system 10 to end processing 42, or alternatively suspend processing pending receipt of new unprocessed urls.

Figure 3:
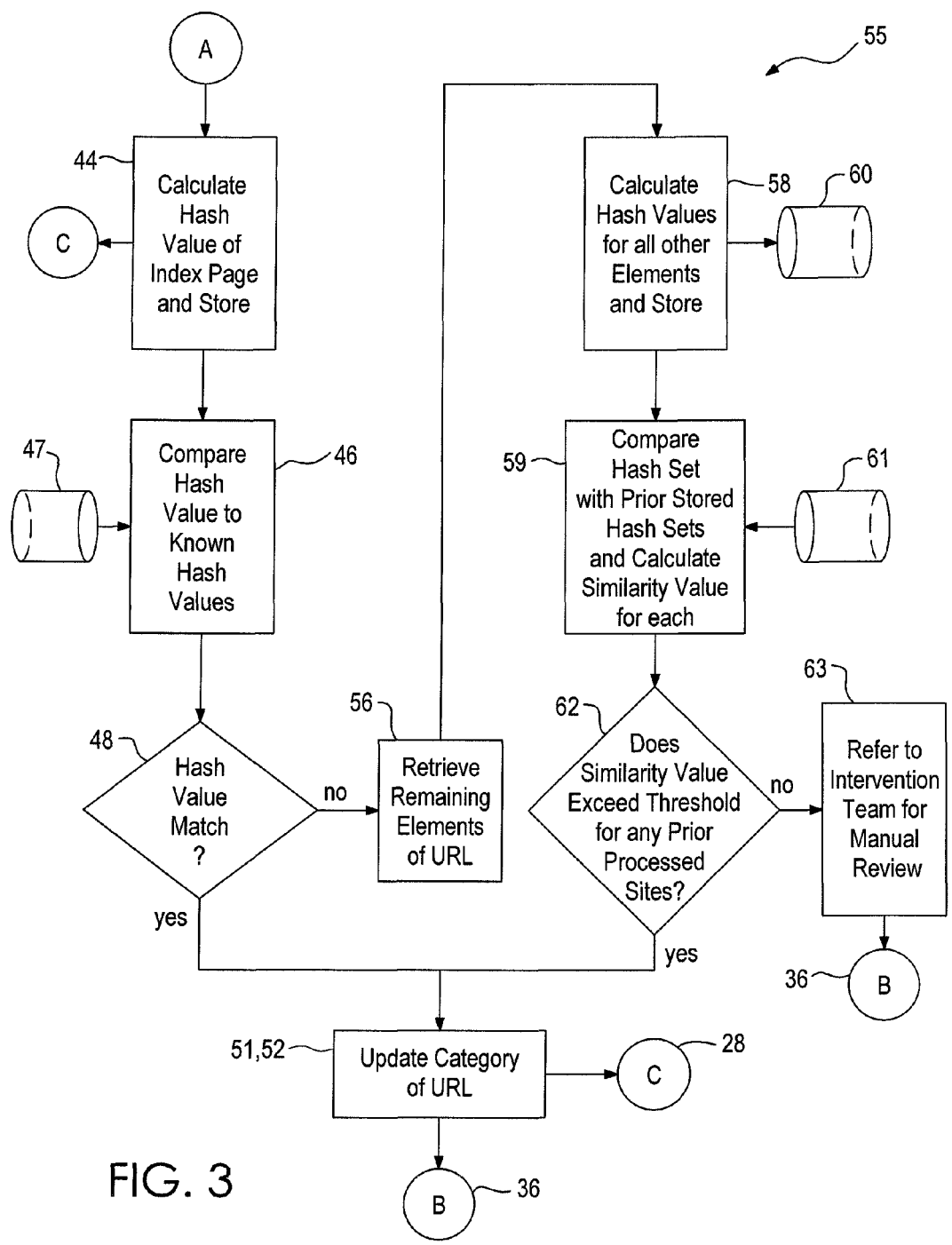
FIG. 3 is a process flow diagram for a part of another embodiment of the invention.

Referring now to FIG. 3, an additional embodiment of system 10 includes further retrieval of other files associated with a potential phishing url site and processing of those files to determine if the site has been previously categorized as a phishing site. Process 35 makes a data comparison for retrieved index page 33 and only notes exact matches of previously calculated hash values. Conversely, process 55 extends process 35 to retrieve other elements associated with url 33 when an index page hash value match is not found. Steps 44-48 of process 55 are the same for like numbered steps of process 35. However, in the event that a match is not found for index page 33, additional elements associated with the url, such as image files, text files, job scripts, PHP files, etc, are retrieved 56 and stored for further processing. Step 56 usually results in the retrieval of 10-15 files, but larger file quantities of 30-40 files retrieved are not uncommon. A time limit is set for any wget fetch processes that attempts to retrieve self-referential file links in the url index file (i.e. a "runaway" fetch), or upon encountering ultra large file downloads so that consume unusually large system resources during the fetch operation in step 56. The inventors have learned that it is best to not retrieve images if the images are only a reference from another unrelated page and to retrieve only items actually present on the phishing server. This avoids fooling the system into thinking that the site is a white listed site when items on the index page reference white listed urls.

The hash values of each retrieved element for url 33 are calculated 58 and stored 60 as a set. The set of hash values of the combined url elements are then compared to known set values 59 held in database 27 by comparing the hash value of each retrieved element to the hash value of each element in a prior processed url set, set by set. For example, if the currently processed url has 5 elements associated with it (numbered 1-5), each with their own hash value, and a prior processed url record exists in database 27 that has 7 hash values associated with 7 retrieved elements, step 59 compares the hash value of element 1 with each of the hash values in the prior processed url. If a match is made in any of the elements, those matches are recorded, and element 2 is then compared for further matches with elements in the prior processed url set. After each element for the url being processed has been compared to each element in the prior processed url, all matches are noted, if any, and recorded. A similarity value is then calculated between the two sets and recorded. That similarity value is then compared in step 62 to a similarity value threshold and if the calculated similarity value is greater than the threshold value, then a match to the prior processed url is recorded. This step is repeated for all of the prior processed urls held in database 27 until a match is found. The category of the currently processed url is then updated 51,52, and recorded in the database 27 at C 28. Control is then returned B 36 to function 37. In the event that no similarity values exceed the pre-set threshold value in step 62, the url is tagged for escalation and referred for manual review 63. This structure in 55 results in a deeper comparison process so that minimal or superficial changes in the content of an index file do not thwart the system 10 from making a correct phishing url identification.

Various methods for calculating a similarity value may be used in step 59. In particular, the embodiment of FIG. 3 does not prescribe a particular similarity measure value, nor does it prescribe a particular calculation method. Any reliable similarity measure applicable to hashing data sets would suffice for the purposes of the invention. However, the inventors have used a few mathematical processes for arriving at an acceptable similarity measure. For example, a preferred measure can be obtained by calculating Jaccard similarity coefficients for each url record comparison made in step 59 pursuant to the formula $$J(A, B) = \frac{A \cap B}{A \cup B}.$$

Other similar methods for calculating similarity coefficients to arrive at a similarity measure between two data sets would work as well, such as: the Simpson method; Braun-Blanquet method; and the Kulczynski 1 or Kulczynski 2 methods.

Figure 4:
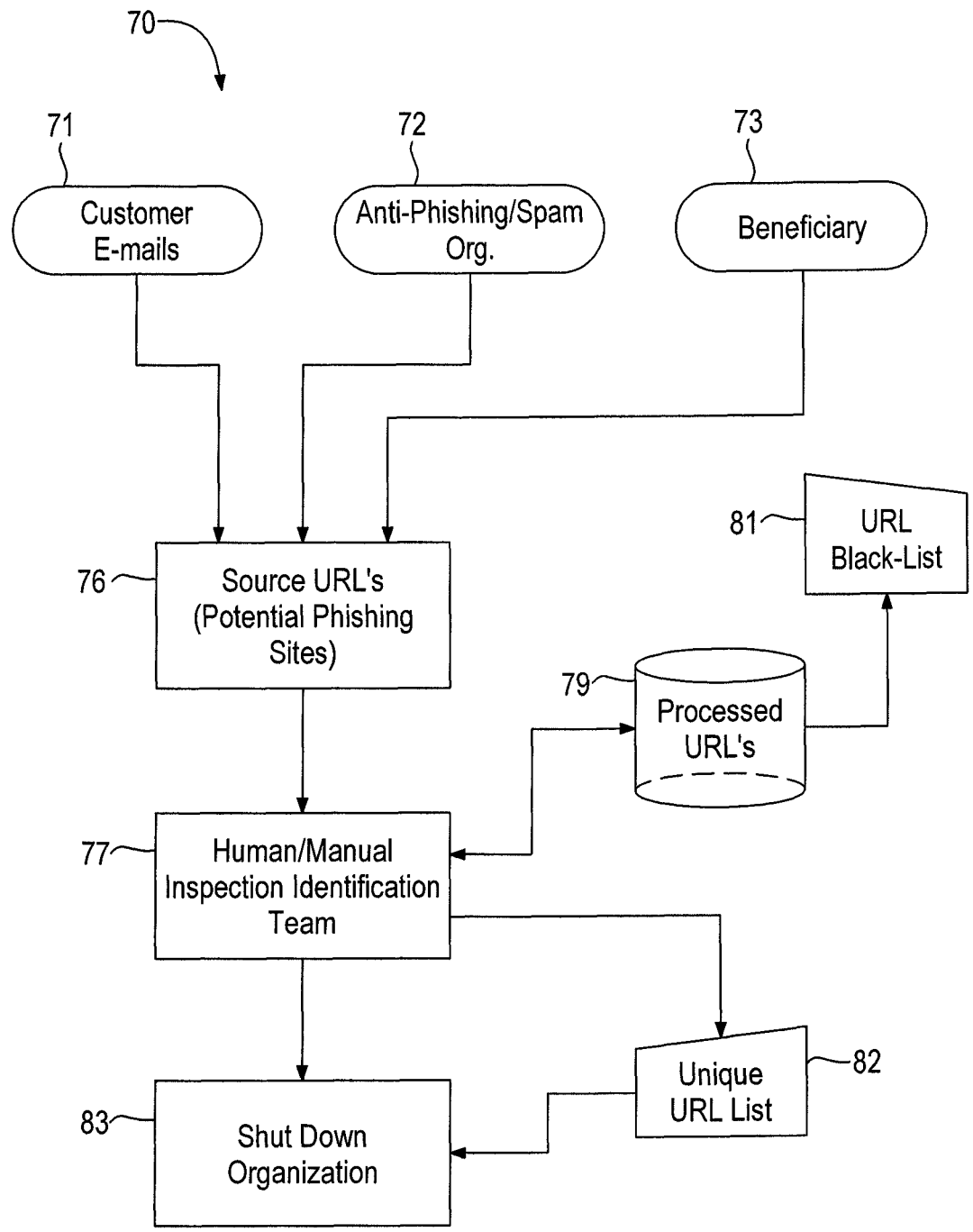
FIG. 4 is a process and partial data flow diagram of a current phishing identification and intervention system; and, FIG. 5 a process and partial data flow diagram of an improved phishing identification and intervention system incorporating the disclosed system.
Figure 5:
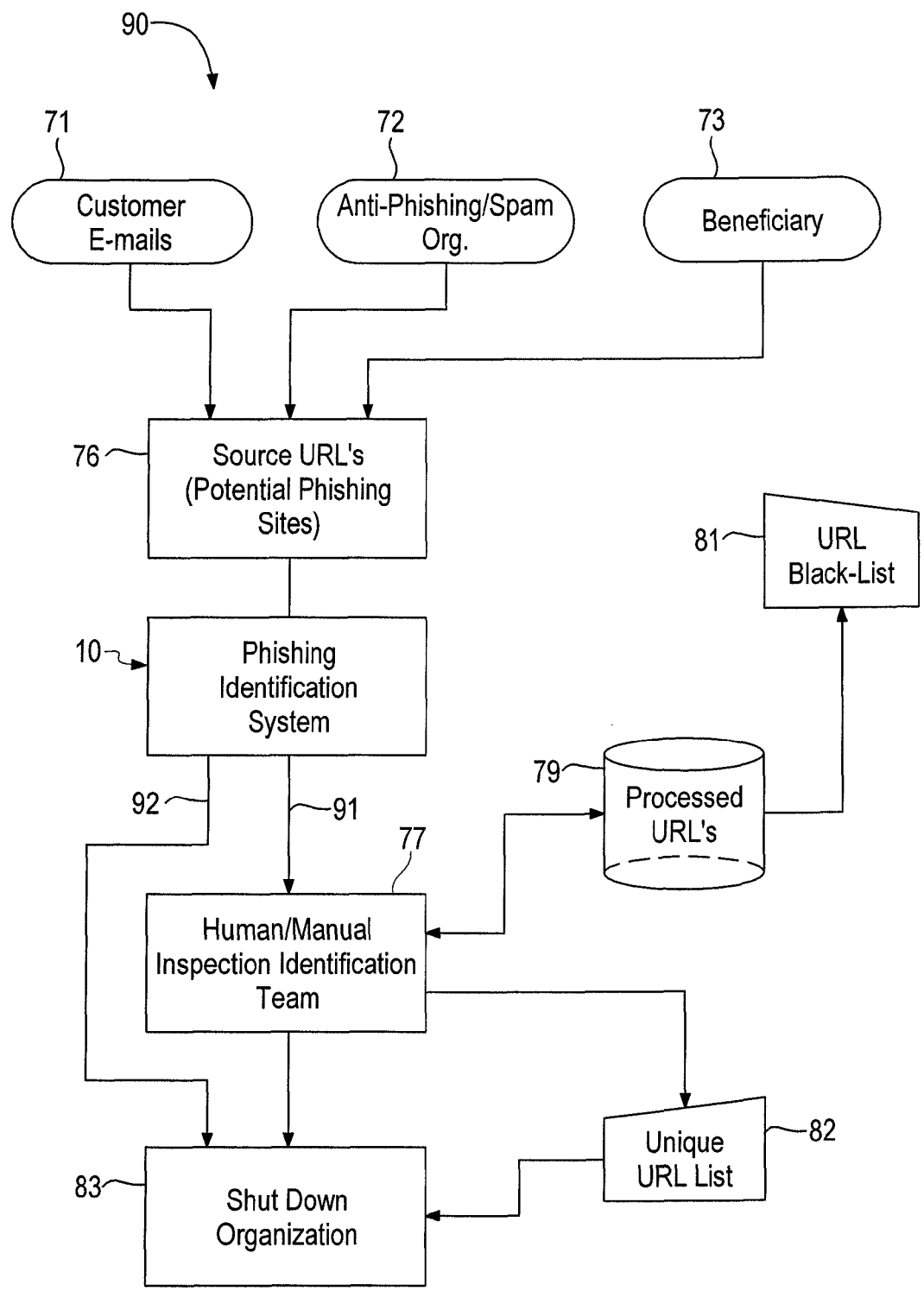

Referring now to FIGS. 4-5, the current nominal anti-phishing process is shown and the implementation of the current system to alter the current process depicted. In accordance to current process 70 shown in FIG. 4, various sources of potential phishing sites, such as customer received (forwarded) e-mails 71, collections of urls from anti-phishing/anti-spam organizations that maintain databases of such urls 72, or a customer 73 subscribing to the system 10, are provided as collected urls 76. These potential phishing urls are then reviewed by a human inspection and identification team 77, typically working around the clock. Once the team 77 has identified a bonefid phishing site, that url is saved in a library of identified phishing urls 79 that can be used as the basis for a blacklist 81 to block further e-mails to beneficiary customers. Also, since many of the urls processed is under this system will include redundant content, team 77 will produce a unique url list 82 omitting prior identified phishing content and send that list to a shut down organization 83 equipped to take action against a phishing site.

As shown in FIG. 5, the current process 70 may be improved by integrating the system 10 to yield an improved process 90. As described above, system 10 pre-processes source urls 76 to identify previously identified phishing website content files so that new urls providing identical or closely matched phishing content can be identified, logged, and omitted from the identification efforts of team 77. System 10 acts to massively diminish the processing demands of team 77 by providing a processing demand stream 91 of urls to the team 77 of only previously un-encountered phishing content files. A demand stream is simultaneously provided to the shut down organization via path 92 so that previously un-encountered phishing urls can be identified as phishing sites and automatically referred for shut down in accordance with policy rules established by the beneficiary of the system. That duel stream structure allows for the off-loading of a majority or a portion of previously un-encountered phishing content files to the shut down organization, as might be determined by the beneficiary of the system. The shut down organization can also provide data to url library 79 to improve black-list 81 upon demand. Hence, by diminishing the redundant urls to be processed by the inspection team 77, process 90 becomes effective in implementing timely shut down actions against unwanted phishing sites as opposed to current systems (e.g. 70) which cannot provide timely url identification of phishing threats.

While I have shown my invention in one form, it will be obvious to those skilled in the art that it is not so limited but is susceptible of various changes and modifications without departing from the spirit thereof.

What is claimed is:
1. A computerized method for facilitating the identification of a phishing website, comprising the steps of:
  a. electronically receiving over a network a series of urls suspected of being phishing websites at a computer system linked to the network;
  b. transmitting the series of urls to a processor portion of the computer system and using the processor portion to create a serial list of said suspect urls ordered chronologically according to receipt time;

c. programming the computer system to establish a processing parameter to determine when to process said suspect url list;

d. when said processing parameter is satisfied, using said processor portion of said computer system to compare one of said suspect urls in said suspect list to a set of previously evaluated urls to determine if said suspect url has been previously examined;

e. if said suspect url has not been previously examined, using said computer system to electronically retrieve over the network an index page at said suspect url;

f. using said processor portion of said computer system to calculate a hash value of said retrieved index page;

g. using said processor portion of said computer system to compare the hash value of said retrieved index page to a dataset of hash values of index pages of previously evaluated suspect urls and if a match is not found outputting a notification from the computer system for alerting a human of the existence of said suspected url for further human examination; and, h. using said processor portion of said computer system to process the next suspected url in said suspect list in accordance with steps e-g until all said urls have been processed, wherein if no match is found in said hash value comparison step, initiating the following steps:

i. using the computer system to retrieve over the network all remaining elements at said url;

j. using the processor portion to calculate a hash value for each of said retrieved elements to create a hash value set associated with said url;

k. using the processor portion to compare said hash value set to prior saved hash value sets and calculating a similarity value for each said comparison;

l. using the processor portion to determine if each said similarity value exceeds a prior established threshold; and, m. using the computer system to output a no match indication if none of said similarity values exceeds said threshold.

2. The method as recited in claim 1, including prior to said index page retrieval step, using the processor portion to compare said suspect url to a white list stored on a database portion of the computer system and if said suspect url is found on said white list stopping further evaluation of said suspect url.

3. The method as recited in claim 1, wherein said step of calculating a hash value comprises the step of calculating a hash value based upon methodologies selected from the group consisting of MD5, WHIRLPOOL, SHA-1, SHA-256, and RIPEMD-160.

4. The method as recited in claim 1, further including the step of saving said suspect url in a the database portion and assigning a category value to said url in response to said method.

5. The method as recited in claim 4, including prior to said communication step the step of adding said url to a black list stored on a database portion of the computer system if no match is found.

6. The method as recited in claim 5, wherein said step of retrieving all remaining elements at said url includes a step of monitoring said retrieval step for unreasonable resource drains and terminating said retrieval process upon occurrence of same.

7. The method as recited in claim 6, further including prior to said url receiving step the step of receiving an e-mail message having one or more suspected phishing site urls and using the processor portion to parse said e-mail message to produce said set of suspect urls.

8. A computerized method for facilitating the identification of a phishing website, comprising the steps of:

a. inputting into a computer system including one or more processors a set of urls each suspected of being a phishing websites;

b. using the computer system to electronically retrieve over a network an index page associated with one of said urls;

c. calculating a hash value of said index page;

d. comparing said hash value of said index page to a set of hash values of previously evaluated urls to find a match;

e. if a match is not found, sending an electronic communication output from the computer system to a human indicting further evaluation of said url is necessary; and, f. repeating steps b-e on all remaining suspected urls in said suspect url set, wherein steps c-e are performed by the one or more processors, and wherein if no match is found in said hash value comparison step, initiating the following steps:

g. retrieving over the network all remaining elements at said url;

h. using the one or more processor to calculate a hash value for each of said retrieved elements to create a hash value set associated with said url;

i. using the one or more processor to compare said hash value set to prior saved hash value sets and calculating a similarity value for each said comparison;

j. using the one or more processor to determine if each said similarity value exceeds a prior established threshold; and, k. outputting from the computer system a no match indication if none of said similarity values exceeds said threshold.

9. The method as recited in claim 8, including prior to said index page retrieval step, comparing with the computer system said suspect url to a white list stored on a database of the computer system and if said suspect url is found on said white list stopping further evaluation of said suspect url.

10. The method as recited in claim 8, wherein said step of calculating a hash value comprises the step of calculating a hash value based upon methodologies selected from the group consisting of MD5, WHIRLPOOL, SHA-1, SHA-256, and RIPEMD-160.

11. The method as recited in claim 10, further including the step of saving said suspect url in the database and using the one or more processor to assign a category value to said url in response to said method.

12. The method as recited in claim 11, further including prior to said url receiving step the step of receiving an e-mail message over the network having one or more suspected phishing site urls and using the one or more processor to parse said e-mail message to produce said set of suspect urls.

13. The method as recited in claim 10, including prior to said communication step the step of adding said url to a black list if no match is found.

14. The method as recited in claim 10, wherein said step of retrieving all remaining elements at said url includes a step of monitoring said retrieval step for unreasonable resource drains and terminating said retrieval process upon occurrence of same.

15. A computerized method for facilitating the identification of a phishing website, comprising the steps of:

a. receiving a url suspected of being a phishing website with a computer system having a processor connected to a computer network;
b. using the computer system to retrieve over the computer network an index page associated with said url;
c. calculating with the processor a hash value of said index page;
d. comparing with the processor said hash value of said index page to a set of hash values of previously evaluated urls to find a match; and,
e. if a match is not found, using the computer system to output an electronic communication to a human indicting further evaluation of said url is necessary,
wherein if no match is found in said hash value comparison step, imitating the following steps:
f. retrieving over the network all remaining elements at said url;
g. using the processor to calculate a hash value for each of said retrieved elements to create a hash value set associated with said url;
h. using the processor to compare said hash value set to prior saved hash value sets and calculating a similarity value for each said comparison;
i. using the processor to determine if each said similarity value exceeds a prior established threshold; and,
j. outputting from the computer system a match indication if any of said similarity values exceeds said threshold.

16. The method as recited in claim 15, wherein said step of calculating a hash value comprises the step of calculating a hash value based upon methodologies selected from the group consisting of MD5, WHIRLPOOL, SHA-1, SHA-256, and RIPEMD-160.

17. The method as recited in claim 16, including prior to said communication step the step of adding said url to a black list.

18. A computer system for facilitating the identification of a phishing website, comprising:
　a processor,
　a non-transitory computer readable medium encoded with processor readable instructions that when executed by the processor implement:

a. a url receiving mechanism receiving a set of urls suspected of being a phishing websites;
b. an index page retrieving mechanism retrieving an index page associated with one of said suspect urls;
c. a calculating mechanism calculating a hash value of said index page;
d. a comparing mechanism comparing said hash value of said index page to a set of hash values of previously evaluated urls to find a match; and,
e. a first communications mechanism sending an electronic communication output to a human indicting further evaluation is needed on the suspect url if a match is not found for said hash value; and,
f. an iterative processing mechanism iteratively processing each said suspect url in accordance with said retrieving mechanism, said calculating mechanism, said match mechanism, and said communication mechanism until said entire set of suspect urls has been processed,
wherein the computer system includes:
e. a url retrieving mechanism retrieving all remaining elements at said url if no match is found;
f. a hash value calculating mechanism calculating a hash value for each of said retrieved url elements to create a hash value set associated with said url;
g. a hash value comparing mechanism comparing said hash value set to prior saved hash value sets and calculating a similarity value for each said comparison;
h. a similarity threshold mechanism determining if each said similarity value exceeds a prior established threshold; and,
i. a second communication mechanism outputting a match indication to a user if any of said similarity values exceeds said threshold.

19. The system as recited in claim 18, wherein said hash value calculating mechanism makes use of methodologies selected from the group consisting of MD5, WHIRLPOOL, SHA-1, SHA-256, and RIPEMD-160.

* * * * *